A. D. HAGER.
HARVESTER-CUTTER.

No. 175,080.　　　　　　　　　Patented March 21, 1876.

Witnesses:　　　　　　　　　　　　　Inventor:
O. D. Moore.　　　　　　　　　　　　Albert D. Hager.
J. Detweiler.

UNITED STATES PATENT OFFICE.

ALBERT D. HAGER, OF CHICAGO, ILLINOIS.

IMPROVEMENT IN HARVESTER-CUTTERS.

Specification forming part of Letters Patent No. 175,080, dated March 21, 1876; application filed November 16, 1875.

*To all whom it may concern:*

Be it known that I, ALBERT D. HAGER, of Chicago, Illinois, have invented a Harvester-Cutter, or, to be more explicit, a new mode for operating the knife or sickle; and I hereby declare that the following is a full and exact description thereof, reference being had to the accompanying drawings, making a part of this specification.

Like letters designate corresponding parts in all the figures.

Figure 1:
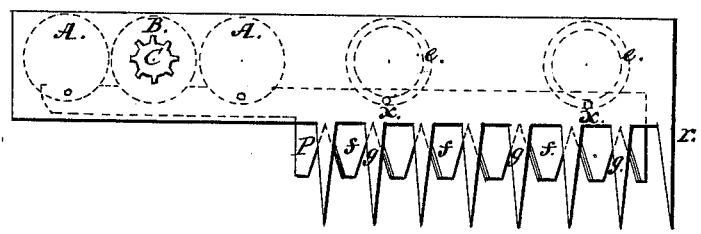
Figure 2:
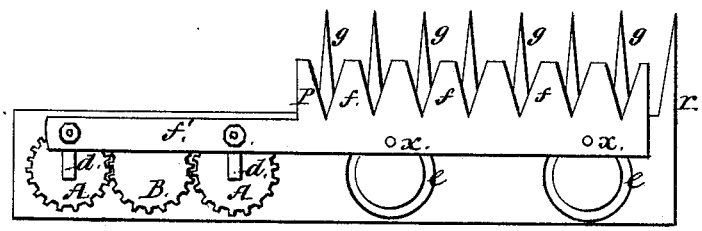
Figure 3:

Figure 1 represents a top or plan view of the cutter-bar. The dotted lines indicate the approximate positions of the wheels, circular grooves, and cutting-knife or sickle, hereafter described. Fig. 2 represents the lower side of the cutter-bar, with the bottom plate removed so as to show the form of the knife and the manner of its attachment to the crank-pin, and its connection with the cog-wheels and other points to be described. Fig. 3 is a side view of one of the fingers.

To enable others to understand it more clearly, I will describe it more in detail.

The parts marked A A are cog-wheels, through which a single or double crank-shaft passes. To these cranks $dd$ the knife-shaft $f'$ is attached. The revolution of the wheels A A gives motion to the knife, and the cutting is done as the knife-sections $fff$ enter the fingers $ggg$ in the direction toward the driving-wheels. B is a cog-wheel, that meshes into the wheels A A. C is a pinion on the shaft of the cog-wheel B. Into this pinion a wheel meshes that drives the wheels A A and B. The circular grooves $e\ e$ (or cranks may be substituted for them) are for a pin or roller attached to the knife to enter, and when the knife is in motion the pin or roller revolves in these grooves and keeps the knife in place. The knife-sections are ground with bevel-edge on but one side. The other side and the front end are left square or unground, in order that they may the more effectually prevent the fingers from becoming clogged. At each revolution of the wheels A A the knife-sections are wholly withdrawn from the fingers. As they emerge, each section enters the base of the finger the next further from the drive-wheel, and the blunt or square end of the section forces forward any fragment of grass or other substance that may be in the finger-opening, until it reaches the point $o$, Fig. 3, which is beyond the cutting point and out of the way of the section, which is to enter and cut in that finger. P is a knife-section, or part of a section, that has no edge, but is placed there to clear the finger next beyond it. $r$ is not of necessity a finger shaped like the rest, but serves as a divider, and also to shield the half-section of the cutter as it is brought forward at or near the end of the cutter-bar.

What I claim as new, and desire to secure by Letters Patent of the United States, is—

1. The fingers transversely grooved at the end of the knife-slot.

2. The combination of the series of cutter-blades blunted at the apex, or at the apex and back, with the series of fingers transversely grooved at the end of the knife-slot, substantially as and for the purposes described.

A. D. HAGER.

Witnesses:
   O. D. MOOERS,
   T. BLACKBURN.